United States Patent [19]

Pfleger

[11] Patent Number: 5,792,532
[45] Date of Patent: Aug. 11, 1998

[54] POLYMER TUBING

[75] Inventor: Wolfgang Pfleger, Tamins, Switzerland

[73] Assignee: EMS-Inventa AG, Zürich, Switzerland

[21] Appl. No.: 527,219

[22] Filed: Sep. 12, 1995

[30] Foreign Application Priority Data

Sep. 13, 1994 [DE] Germany .......... 44 32 584.3

[51] Int. Cl.⁶ .......... F16L 11/11
[52] U.S. Cl. .......... 428/36.9; 428/36.91; 428/36.92; 428/35.7; 138/121; 138/137; 138/141
[58] Field of Search .......... 138/121, 122, 138/137, 141; 428/35.7, 36.6, 36.7, 36.9, 36.91, 36.92, 474.4, 475.5, 475.8, 36.8, 174

[56] References Cited

U.S. PATENT DOCUMENTS

| 3,578,777 | 5/1971 | DeGain .......... 138/122 |
| 3,605,817 | 9/1971 | Bauman et al. .......... 138/122 |
| 3,738,394 | 6/1973 | Westerbarkely .......... 138/122 |
| 4,106,213 | 8/1978 | Witte .......... 34/79 |
| 4,236,509 | 12/1980 | Takashi et al. .......... 138/122 |
| 4,327,776 | 5/1982 | Meserole .......... 138/122 |
| 4,424,834 | 1/1984 | Sumi et al. .......... 138/121 |
| 4,647,416 | 3/1987 | Seiler et al. .......... 264/118 |
| 5,279,332 | 1/1994 | Winter et al. .......... 138/121 |
| 5,407,300 | 4/1995 | Guindon et al. .......... 138/111 |

FOREIGN PATENT DOCUMENTS

| 2138903 | 12/1994 | Canada . |
| 0010751 | 10/1979 | European Pat. Off. . |
| 2 124 094 | 5/1971 | Germany . |
| 4000434 | 1/1990 | Germany . |
| 90 01 467 | 5/1990 | Germany . |
| 93191901 | 12/1993 | Germany . |
| 93198795 | 12/1993 | Germany . |
| 94021805 | 2/1994 | Germany . |
| 43 30 855 | 10/1994 | Germany . |
| 463 210 | 8/1967 | Switzerland . |

*Primary Examiner*—Rena L. Dye
*Attorney, Agent, or Firm*—Browdy and Neimark

[57] ABSTRACT

Polymer tubing, made of at least one polymer layer, has a partial section of the tubing which is corrugated and wherein the rings formed by the corrugations extend around the tube axis, with the corrugations being embodied at least partially in an oval shape or in the shape of an ellipse or in the form of a circle, which is flattened on one side.

31 Claims, 5 Drawing Sheets

X (10:1)

B-B (10:1)

A-A (5:1)

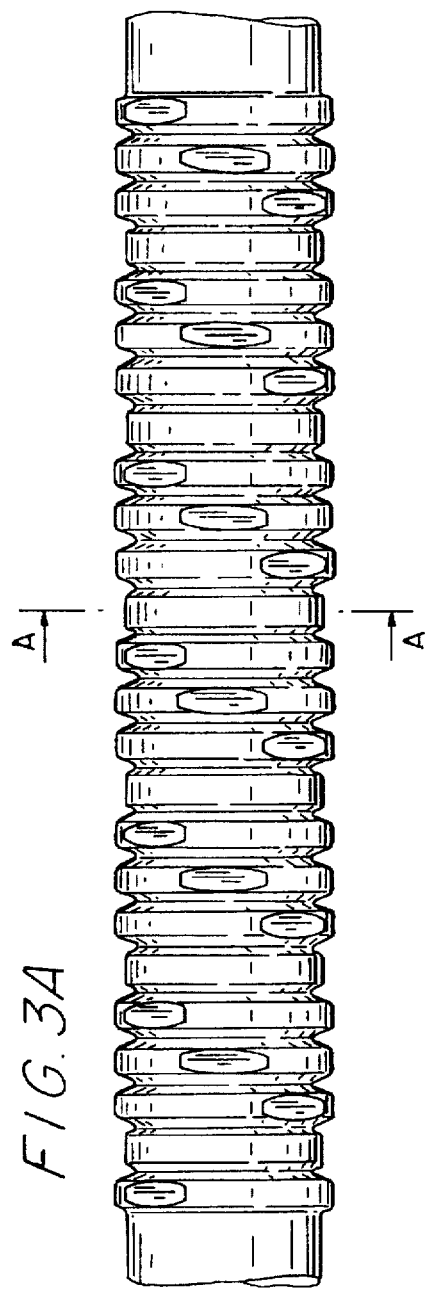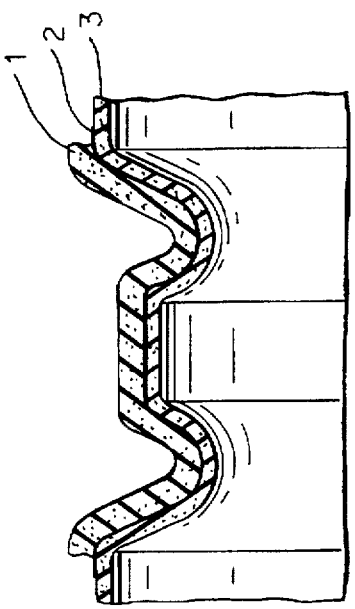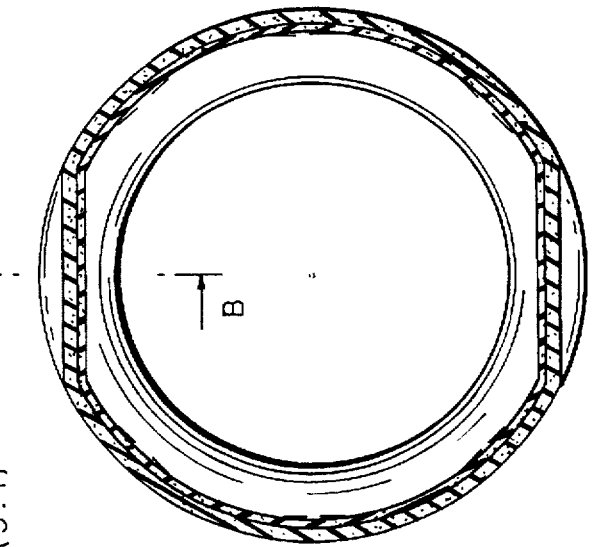

A-A (5:1)

B-B (10:1)

5,792,532

POLYMER TUBING

BACKGROUND OF THE INVENTION +ps

Technical Field

The invention relates to polymer tubing with a novel embodiment of its corrugation geometry. The polymer tubing is corrugated in at least one partial section and the rings formed by the corrugation extend around the tube axis. The polymer line in accordance with the invention has a high degree of flexibility, bursting pressure resistance and a short linear extension.

A field of application of the polymer tubing in accordance with the invention is coolant lines used in automobile manufacturing, e.g. for AC and/or radiator lines.

The polymer tubing in accordance with the invention can be produced by co-extrusion of a polymer pipe and subsequent formation of the corrugation, including flattenings, by means of blow or aspiration molding. The polymer tubing in accordance with the invention can alternatively be produced by means of extrusion or coextrusion or blow molding, or sequential blow molding with or without pipe manipulation.

Prior Art

Corrugated pipes and corrugated hoses are known in various embodiments in actual use. Such pipes and hoses are used in the automobile industry for example. Thus, tubing with corrugated walls is already known from German Patent Publication DE-A-40 00 434 and EP publication EP 0 010 751. However, it has the disadvantage that its corrugations can be widened not only by a pull from the outside, but also by pressure from the inside. However, in connection with coolant lines in particular, repeated pressure fluctuations which as a rule are also accompanied by strong temperature changes, result in material fatigue because of the changing stresses triggered thereby and therefore lead to premature breakdown of the tubing.

In addition, in accordance with the narrow tolerances in the automobile industry, there is a demand for tubing whose change in length is as small as possible as a result of heating and pressure stresses. In the process, this allows great freedom in the arrangement of the tubing, since it is flexible because of is corrugated form and can be bent over relatively small radii.

However, because of their corrugated shape such pipes and hoses have the disadvantage that they permit relatively large changes in length as a result of pulling strains in the linear direction as well as under the effect of interior pressures. But in many cases such changes in length are not desirable.

OBJECT AND SUMMARY OF THE INVENTION

It is therefore an object of the present invention to provide polymer tubing which can be charged with pressure, has a high degree of flexibility, bursting pressure resistance and short linear extension and has a novel geometry while avoiding the disadvantages of the previously mentioned prior art.

The invention relates in particular to polymer tubing which can be put under pressure, such as a coolant line for automobiles.

Tubing in accordance with the invention has surprising advantages over corrugated tubing in accordance with the prior art as described in Germany Utility Models DE-GM 93 19 190.1, DE-GM 93 19 879.5 and DE-GM 94 02 180.5. These advantages, over normal corrugated tubing or that having strip-shaped connection between the corrugations, are achieved by novel geometry, i.e. the shaping of the corrugations or in that the corrugations do not (at least in part) have a circular cross section and instead are embodied in an oval shape or in the shape of an ellipse or in the shape of a circle which is flattened in at least one location. The advantages include:

- improved efficiency of stiffening in the longitudinal direction and therefore less changes in length in case of interior pressure stresses,
- no change of the minimum bending radius in respect to the initial corrugated shape, in particular in connection with embodiments in which the flattening is continuously displaced at a defined angle,
- no increase in collapsing tendencies, such as with pipes reinforced by ribs or beadings,
- a 10% higher bursting resistance.

BRIEF DESCRIPTION OF THE DRAWINGS

Various corrugated profiles of the tubing according to the invention are represented in the drawings, wherein

FIG. 3A shows an elevation view of an embodiment of polymer tubing in accordance with the invention having a corrugated profile called "GAMMA OPEN-END WRENCH", FIG. 3B shows a cross-section through section A—A of FIG. 3A.

FIG. 3C shows a cross-section through section B—B of FIG. 3B.

DETAILED DESCRIPTION OF THE PREFERRED EMBODIMENT(S)

In FIGS. 1–4, the outer layer is identified by (1), the intermediate layer by (2) and the inner layer by (3).

Figure 4A:
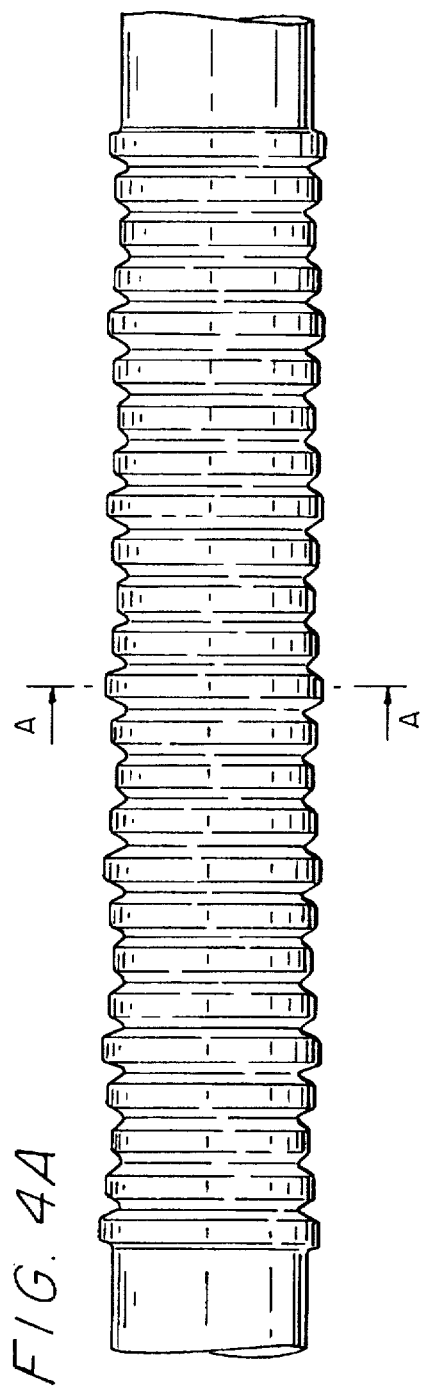
FIG. 4A shows an elevation view of a further corrugated profile in accordance with the invention, wherein the corrugation is embodied as an ellipse.
Figure 4B:
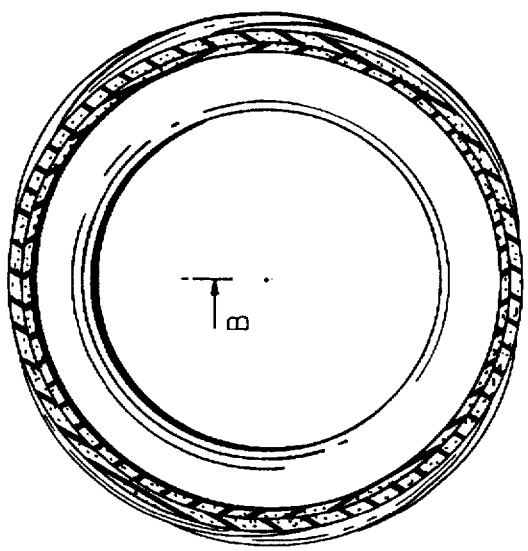
FIG. 4B shows a cross-section through section A—A of FIG. 4A.
Figure 4C:
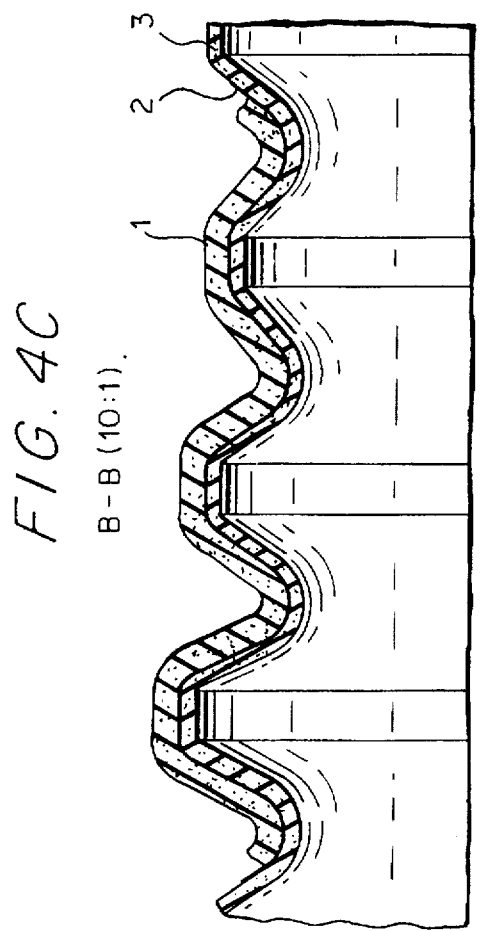
FIG. 4C shows a cross-section through section B—B of FIG. 4B.
Figure 5:
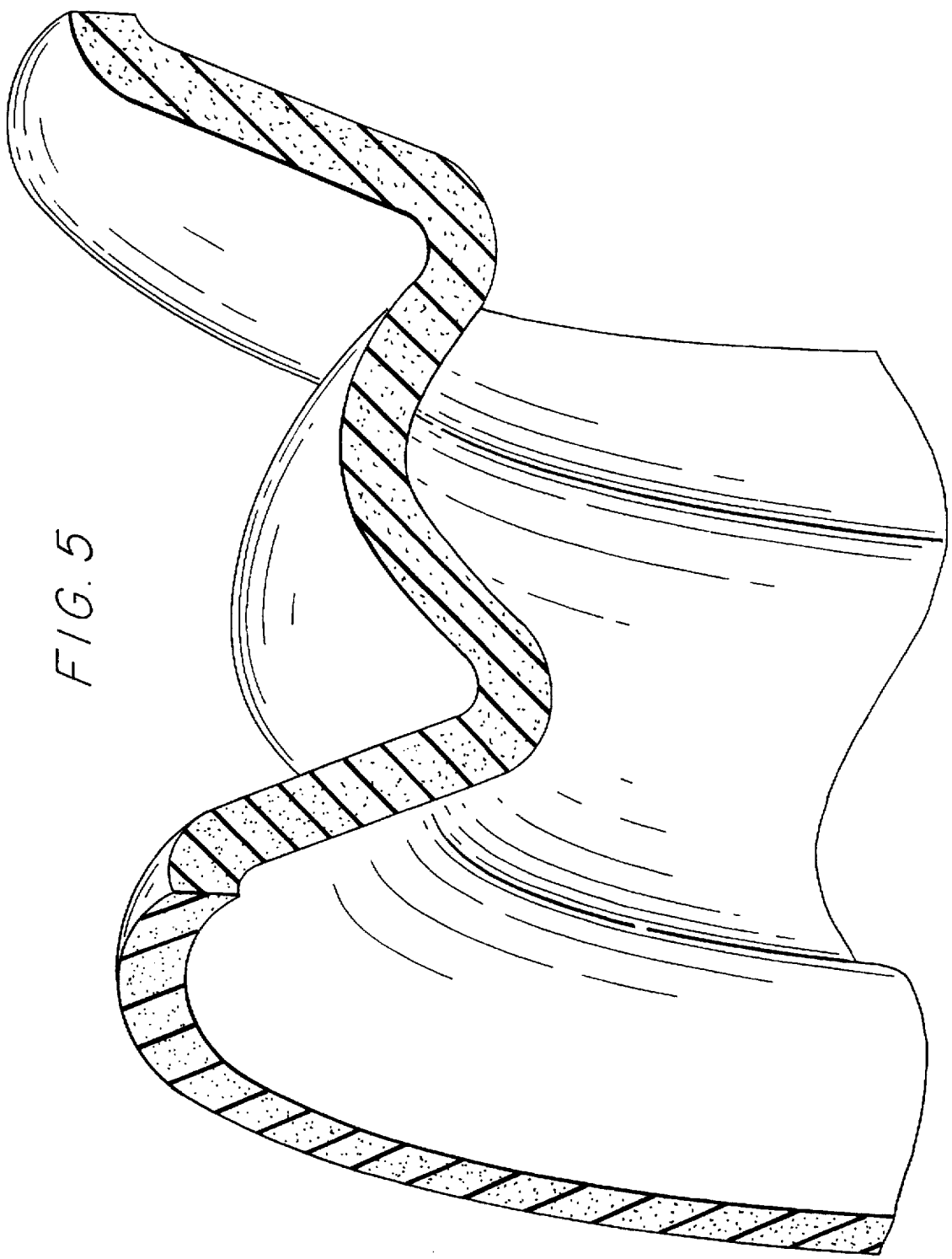
FIG. 5 shows single-layer tubing in accordance with the invention of the type in FIG. 4, which was the basis for calculations by means of the finite element method (FEM).

In accordance with a calculation by means of the finite elements method (FEM), the embodiment in accordance with FIG. 4 shows a result in relation to the change in length which is improved by 10% which can be compared with the embodiment in accordance with FIG. 5.

The polymer tubing in accordance with the invention can be produced by extrusion or co-extrusion of its polymers to form pipes and by subsequent formation of the corrugations and strips by aspiration (vacuum) or pressure.

The polymer tubing in accordance with the invention can also be produced in its various embodiments by an extrusion blow molding process (e.g. sequential extrusion blow molding, with or without parison manipulation).

These processes are state of the art and have been described, among others, in DE-GM 93 19 190 and DE-GM 93 19 879.

In connection with its use as a coolant line, the polymer tubing in accordance with the invention, which can be charged with pressure, consists of at least one (or several) polymer layers of polymers which are compatible, particularly at the contact surfaces, wherein at least a partial portion of the tubing is corrugated and wherein the rings formed by the corrugations extend concentrically around the tube axis. The polymer tubing in accordance with the invention has a high degree of flexibility, resistance to hydrolysis and bursting and stability in respect to linear extension.

Particularly small linear changes in pressure-charged corrugated tubing are achieved with very stiff materials. These stiff materials, such a homopolyamide or polyphenylene sulfide, have the disadvantage of transmitting structure-borne noise and being acoustically unsuitable. Efforts are made in the automobile industry, for example, to minimize noises. Noise generation can be reduced by means of co-extrusion therewith of particularly soft materials from the group of thermoplastic elastomers in such a way that these soft materials constitute the surface of the tubing.

In connection with gasoline filler necks it is important that the corrugated tubing have areas of great stretching ability and areas with reduced stretching ability in addition to great flexibility. The polymer tubing in accordance with the invention achieves this in a particularly advantageous way in that a particularly flexible embodiment of the corrugated shape is disposed in areas where great stretching ability is demanded, while the special design according to the invention is used in places where reduced stretching ability is demanded.

Since the polymer tubing in accordance with the invention has advantages over prior art corrugated tubing in connection with pressurized systems as well as systems with underpressure, the polymer tubing in accordance with the invention can preferably also be used in underpressure systems, such as air supply lines in the engine inlet area.

The polymer tubing in accordance with the invention is constituted in an advantageous manner from polymer layers of different functions, for example with an inner layer 3 which is inert in respect to the medium being conducted and with an intermediate layer 2 which is resistant to pressure and mechanical effects.

In addition it is possible to use a very soft polymer outer layer 1 on the surface of tubing according to to the invention for noise damping. This soft polymer can be selected from thermoplastic elastomers (TPE) on the basis of polyamide (TPE-A), polyester (TPE-E), polyolefins (TPE-O, TPE-V) as well as styrene (TPE-S).

Mono-hoses or pipes of two or more layers of polymers which are compatible with each other are preferred. Embodiments with layers of polymers which have an unsatisfactory compatibility with each other advantageously contain an interim layer of polymers which are compatible with those of the adjoining layers. Homo- and copolyolefins containing functional groups, or blends of different polymers of the layers to be connected are suitable for this in an advantageous manner. These functional groups, which can be crosslinked caoutchouc particles comprising ethylene-propylene-terpolymers (EPDM), nitrile caoutchouc (NBR) and/or ethylene-propylene copolymers (EPM), and can be distributed by dispersion, make the layers compatible.

The layer resistant to bursting pressure preferably consists of polyamides from the group of homopolyamides, co-polyamides, their blends or mixtures which each other or with other polymers, wherein polyamides of linear aliphatic monomers with 6 to 12 C-atoms, aromatic monomers with 6 to 12 C-atoms and/or cyclo-aliphatic monomers with 6 to 20 C atoms are preferred. Particularly preferred are polyamide 6, polyamide 66 and polyamide 12.

The inner layer 3 according to the invention preferably consists of polyolefins. In this case halogenated and non-halogenated homo- and copoly-olefins, their mixtures and their blends are particularly preferred, especially those having functional groups which cause compatibility with the pressure-resistant layer. If this compatibility is not provided, the already mentioned intermediate layer is required.

Preferred halogenated types are fluorinated homo- or co-polyolefins, such as PVDF and ETFE. Compatible or compatibility-generating polymers are, besides grafted polyolefins, also those which have received their functional groups by means of suitable copolymers, for example acrylic acid derivatives and homologues.

A further preferred embodiment has an inner layer of a blend of a homopolyolefin, for example polypropylene, with an EPDM, which preferably is crosslinked, an intermediate layer of a functionalized homo- or copolyolefin and an outer layer of polyamide 12.

A particularly advantageous embodiment of the polymer tubing in accordance with the invention is shown in FIGS. 3C and 4C consists of an inner layer 3, whose polymer essentially is a copolyolefin grafted with alpha-unsaturated dicarboxylic acid and whose outer layer 1 is essentially polyamide 12. Another preferred embodiment consists of an inner layer 3 of polyvinylidene fluoride and an outer layer 1 of polyamide 12. The intermediate layer 2 required in this case is advantageously a blend of essentially polyamide 12 and PVDF.

A further advantageous embodiment of the polymer tubing in accordance with the invention consists of an inner layer 3 whose polymer is essentially a polyphenylene sulfide or its copolymer with functional groups, and whose pressure-resistant layer 1 is polyamide 12.

A further preferred embodiment of the polymer tubing in accordance with the invention consists of an inner layer 3 selected from the group of polyesters and an outer layer 1 of polyamide 6 or 12.

A further preferred embodiment can be employed if a polymer by itself meets the requirements for bursting pressure resistance, chemical resistance and barrier effects. In such a case a so-called mono-pipe, a corrugated conduit consisting of one layer, can be used.

In this latter case, preferred materials are polyamides, their copolyamides as well as their blends with each other and with other polymers, halogenated polyolefins, non-halogenated polyolefins, polyphenylene sulfide, polyester and others.

The polymers of the individual layers can be modified with production- or use-specific additives in accordance with the state of the art. Stabilizers, plasticizers, pigments and additives for improving impact resistance or conductivity in particular should be mentioned in this connection.

The layer thicknesses of the individual layers of the embodiments in accordance with the invention can be adapted to the requirements, for example in regard to barrier effects, bursting pressure resistance or impact resistance and vary between 0.05 mm and 3 mm.

In an embodiment of the corrugation geometry which is particularly in accordance with the invention, each corrugation is flattened or embodied as an ellipse or oval on at least one side. The flattening or the short semi-axis of the ellipse or the oval can in particular be continuously displaced at a defined angle.

With the same flexibility and bendability as well as a 15% higher bursting pressure, the tubing in accordance with the invention has a linear extension which is less by 47%. This can be seen in the following Table 1. In this case several profile shapes of mono-pipes made of Grilamid L25 of the same wall thickness (1 mm) were tested:

TABLE 1

Figure 1A:
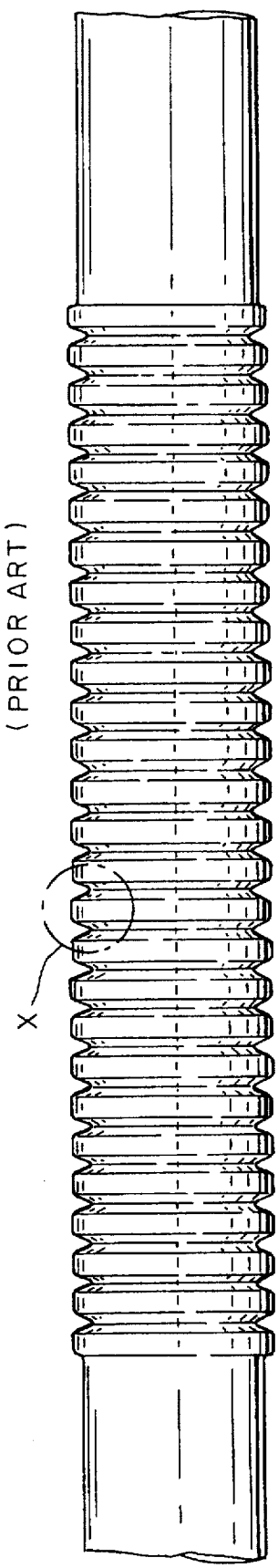
FIG. 1A shows an elevation view of corrugated tubing in accordance with the prior art, having a so-called "GAMMA" profile.
Figure 1B:
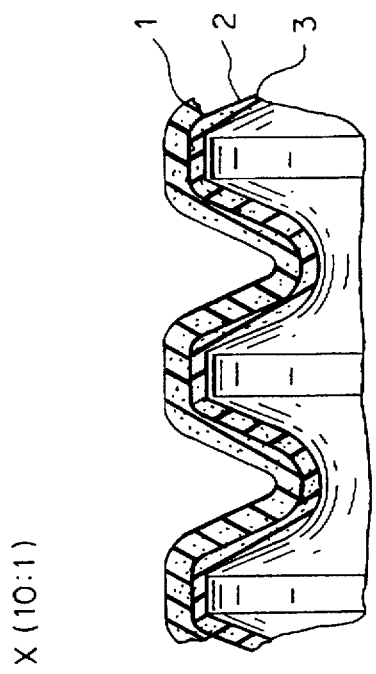
FIG. 1B shows a longitudinal cross section through a segment in circle X of FIG. 1A.
Figure 2A:
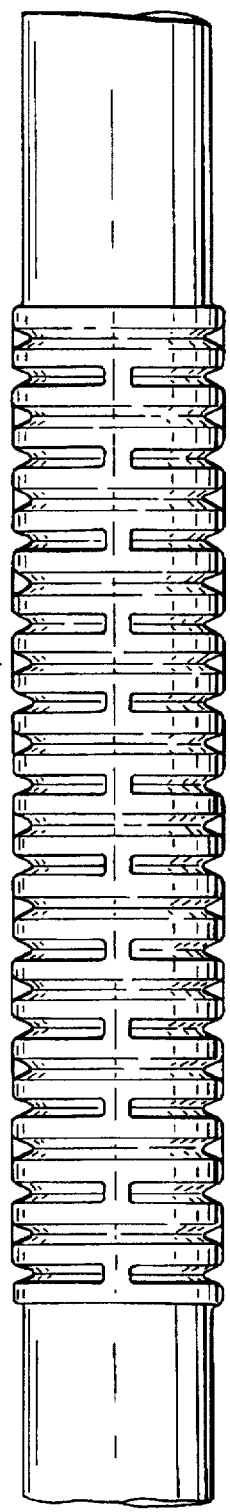
FIG. 2A shows an elevation view of corrugated tubing of a so-called rib prior art profile "R" (GAMMA rib in accordance with DE-GM 94 02 180)
Figure 2C:
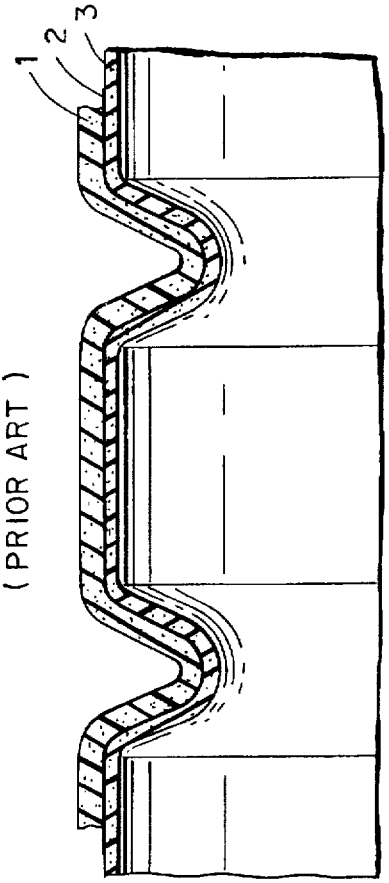
FIG. 2C shows a cross-section through section B—B of FIG. 2B.
Figure 2B:
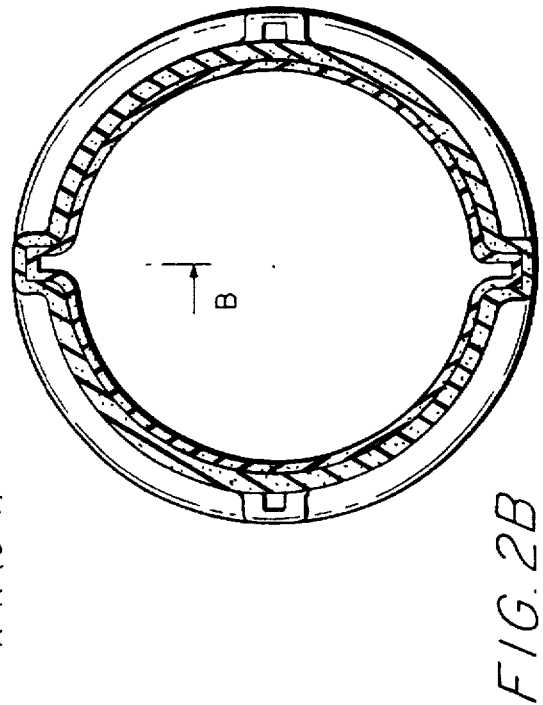
FIG. 2B shows a cross-section through section A—A of FIG. 2A.

|  | Linear extension at 2 bar Interior Pressure and at 125° C. [%] | Minimum Bending Radius [mm] | Tendency to collapse | Bursting Pressure at 100° C. [bar] |
| --- | --- | --- | --- | --- |
| Corrugated Profile acc. to FIG. 1 (GAMMA)* | 39.3 ± 2 | 15 | small | 8.7 ± 0.4 |
| Corrugated Profile acc. to FIG. 2 (GAMMA RIB) | 36.1 ± 2 | 30 | high | 7.2 ± 0.3 |
| Corrugated Profile acc. to FIG. 3 (according to the invention) (GAMMA OPEN END WRENCH) | 21 ± 2 | 15 | small | 10.0 ± 0.4 |

*Prior art.

What is claimed is:

1. Polymer tubing capable of being charged with pressure, having a high degree of flexibility, high bursting pressure resistance, and a short linear extension, made of at least one polymer layer, wherein the tubing is corrugated in at least one partial section and has rings formed by the corrugations extending concentrically around the tube axis, wherein the corrugations are oval shapes, elliptical shapes or circle shapes flattened as a geometric segment on at least one side of the rings and wherein said flattened geometric segments are continuously displaced circumferentially at a defined angle which is no greater than about 180° C.

2. Polymer tubing in accordance with claim 1 wherein the polymer tubing consists of a pressure-resistant layer of a polymer selected from a group consisting of homopolyamides, co-polyamides, homo-polyesters, copolyesters, polyphenylene sulfide (PPS), phenylene-sulfide copolymers, polyvinylidene fluoride (PVDF), vinylidene fluoride copolymers, halogenated and non-halogenated polyolefins and copolymers thereof, polyphenylene ether (PPE) and mixtures or blends thereof.

3. Polymer tubing in accordance with claim 2, wherein the polymer is polybutylene terephthalate or polyethylene terephthalate or their copolymers or mixtures or blends thereof.

4. Polymer tubing in accordance with claim 2, wherein the homo- or copolyamides are constituted of linear aliphatic monomers with 6 to 12 C-atoms or of cyclo-aliphatic monomers with 6 to 20 C-atoms.

5. Polymer tubing in accordance with claim 4, wherein the polymer is a homo-polyamide of polyamide 6, polyamide 66 or polyamide 12, optionally modified by process-specific or use-specific additives.

6. Polymer tubing in accordance with claim 2, wherein the polymer is a polyolefin of tetrafluorethylene, polypropylene, crosslinked or non-crosslinked polyethylene, polybutene-1 or poly-4-methylpentene.

7. Polymer tubing in accordance with claim 2, wherein the polymer is a mixture or a blend of polyphenylene ether and a homo- or copolyamide.

8. Polymer tubing in accordance with claim 1 wherein the polymer tubing consists of at least one inner layer, at least one intermediate layer and at least one outer layer, wherein the at least one intermediate layer is a barrier layer, a primer layer or both a barrier layer and a primer layer.

9. Polymer tubing in accordance with claim 1 wherein the polymer tubing consists of at least one inner layer, which is inert in respect to a conveyed medium, and a second layer outside said inner layer, which second layer is resistant to pressure and mechanical effects.

10. Polymer tubing in accordance with claim 9, wherein the second layer resistant to pressure and mechanical effects consists essentially of a homopolyamide or a copolyamide or of their blends or mixtures with each other or other polymers.

11. Polymer tubing in accordance with claim 10, wherein the homo-polyamides or copolyamides are constituted of linear aliphatic monomers with 6 to 12 C-atoms or of cyclo-aliphatic monomers with 6 to 20 C-atoms.

12. Polymer tubing in accordance with claim 10, wherein the homopolyamide is polyamide 6, polyamide 66 or polyamide 12, optionally modified by process-specific or use-specific additives.

13. Polymer tubing in accordance with claim 9, wherein the layer resistant to pressure and mechanical effects consists essentially of a blend or mixture of a homo-polyamide or a copolyamide and polyphenylene ether (PPE).

14. Polymer tubing in accordance with claim 8, wherein the outer layer consists essentially of a thermoplastic elastomer (TPE), optionally having a functional group which make said elastomer compatible with the adjoining layer.

15. Polymer tubing in accordance with claim 1 wherein the inner layer consists essentially of a halogenated or non-halogenated homo- or copolyolefin, of mixture or blend thereof, optionally having a functional group which make them compatible with the outer layer.

16. Polymer tubing in accordance with claim 9 wherein the inner layer consists essentially of a homo- or copolyolefin, or mixture or blend thereof, optionally having a functional group which makes them compatible with the outer layer, and which contains cross-linked caoutchouc particles which are dispersed therein.

17. Polymer tubing in accordance with claim 16, wherein the functional groups are crosslinked caoutchouc particles comprising an ethylene-propylene-terpolymer, nitrile caoutchouc, ethylene-propylene-copolymer or mixture thereof.

18. Polymer tubing in accordance with claim 7, wherein the inner layer consists essentially of a silane-grafted, crosslinkable, halogenated or non-halogenated homo- or copolyolefin, or a mixture or blend thereof, optionally having a functional group which make them compatible with the outer layer.

19. Polymer tubing in accordance with claim 9, wherein the inner layer consists essentially of polyphenylene sulfide (PPS), or a mixture or blend thereof, optionally having functional groups which are compatible with the outer layer.

20. Polymer tubing in accordance with claim 9, wherein the inner layer consists essentially of polyester.

21. Polymer tubing in accordance with claim 9, wherein the inner layer consists essentially of homo- or co-polyvinyl chloride, or a mixture or blend thereof.

22. Polymer tubing in accordance with claim 9, wherein the inner layer consists essentially of a homo- or copolyacetals, or a mixture or a blend thereof.

23. Polymer tubing in accordance with claim 9, wherein the inner layer consists essentially of a polyolefin elastomer (TPE-O) or a mixture or blend thereof, which optionally has a functional group which makes said elastomer compatible with the adjoining layer.

24. Polymer tubing in accordance with claim 9, wherein the inner layer consists essentially of a halogenated or non-halogenated homo- or copolyolefin which is insufficiently compatible with the outer layer and wherein an intermediate layer, which is compatible with the inner layer, has been disposed between the inner layer and outer layer (therebetween), wherein the intermediate layer consists essentially of a grafted polyolefin, a copolyolefin which is grafted or provided with functional groups by copolymerization, or a blend thereof with a non-functionalized polymer, or a blend of polymers which are to be connected with each other and, optionally, further polymers.

25. Polymer tubing in accordance with claim 15, wherein the inner layer consists essentially of a copolyolefin with grafted, alpha-unsaturated dicarboxylic acids, optionally partially replaced by non-grafted polyolefin, and that the layer which is resistant to pressure and mechanical effects is modified or unmodified polyamide 12.

26. Polymer tubing in accordance with claim 9, wherein the inner layer consists essentially of PVDF, the layer which is resistant to pressure and mechanical effects consists of modified polyamide 6 or polyamide 12, and the intermediate layer is a blend of the polymers of the inner layer and the layer which is resistant to pressure and mechanical effects.

27. Polymer tubing in accordance with claim 24, wherein the inner layer is a blend of polyolefin or copolyolefin with EPDM, the intermediate layer is a functionalized polyolefin or copolyolefin, and the layer which is resistant to pressure and mechanical effects is a modified or unmodified polyamide 12.

28. Polymer tubing in accordance with claim 1 produced by co-extrusion of a polymer pipe and subsequent formation of the corrugations, including flattenings, by blow or aspiration molding.

29. Polymer tubing in accordance with claim 1 produced by extrusion blow molding, co-extrusion blow molding or sequential blow molding with or without hose manipulation.

30. A polymer tubing in accordance with claim 8, wherein the outer layer consists essentially of a thermoplastic elastomer selected from the group consisting of polyamide elastomer (TPE-A), polyester elastomer (TPE-E), polyolefin elastomer (TPE-O), styrene elastomer (TPE-S) and mixtures or blends thereof, and said inner layer consists essentially of polybutylene terephthalate (PBT) or a homo- or copolyoxymethylene (POM) or a mixture or blend thereof.

31. A corrugated polymer tubing made of at least one polymer layer comprising a series of axially spaced rings which extend substantially entirely about the circumference of said tubing, a plurality of said rings having an oval or elliptical shape having a minor axis and a major axis, or circular shape with a flattened segment portion on at least one side, each of said rings differing from at least one adjacent neighboring ring in the orientation or location of said major and minor axes if said rings are in the shape of an oval or an ellipse, or in the location or orientation of said flattened portion if said plurality of rings are in the shape of a circle having a flattened portion on at least one side, whereby said major and minor axes or said flattened portions are spaced circumferentially and axially along said polymer tubing.

* * * * *

UNITED STATES PATENT AND TRADEMARK OFFICE
CERTIFICATE OF CORRECTION

PATENT NO. : 5,792,532
DATED : Aug. 11, 1998
INVENTOR(S) : Wolfgang Pfleger et al.

It is certified that error appears in the above-identified patent and that said Letters Patent is hereby corrected as shown below:

Cover page, under item [19], delete "Pfleger" and insert therefor --Pfleger et al--;

Cover page, line [75], delete "Tamins, Switzerland" and insert therefor --Klagenfurt, Austria--, and insert --Josef Seidl, Mattighofen, Austria--.

Signed and Sealed this

Twenty-fourth Day of November, 1998

Attest:

BRUCE LEHMAN

*Attesting Officer*   *Commissioner of Patents and Trademarks*